Sept. 17, 1968     P. WEBB ET AL     3,401,683
APPARATUS AND METHOD FOR METABOLISM MEASUREMENT
Filed June 3, 1965     2 Sheets-Sheet 1
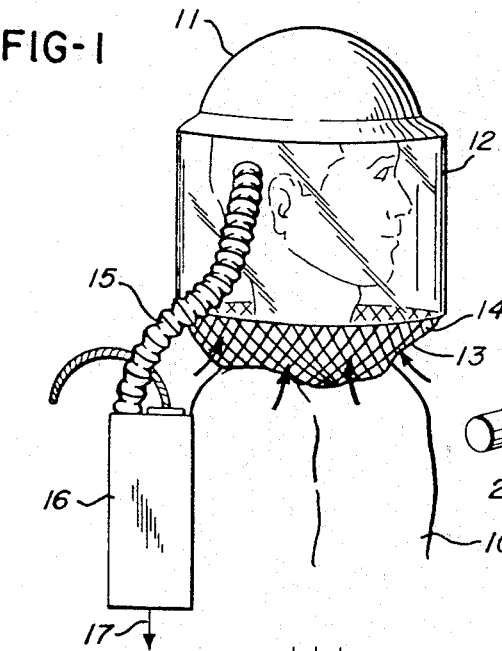
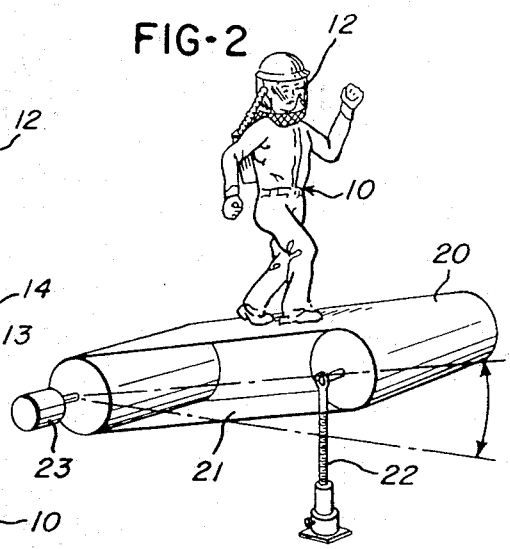
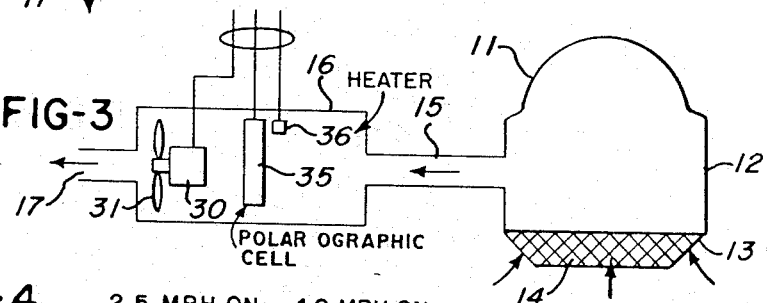
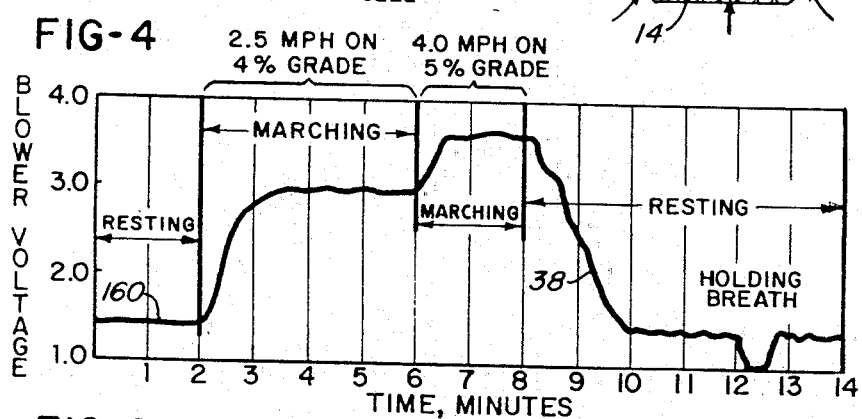
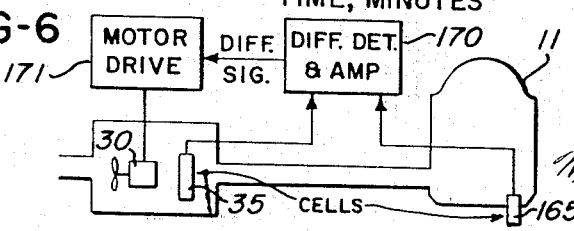
INVENTORS
PAUL WEBB
JEREMY F. CROCKER
BY
Marechal, Biebel, French & Bugg
ATTORNEYS

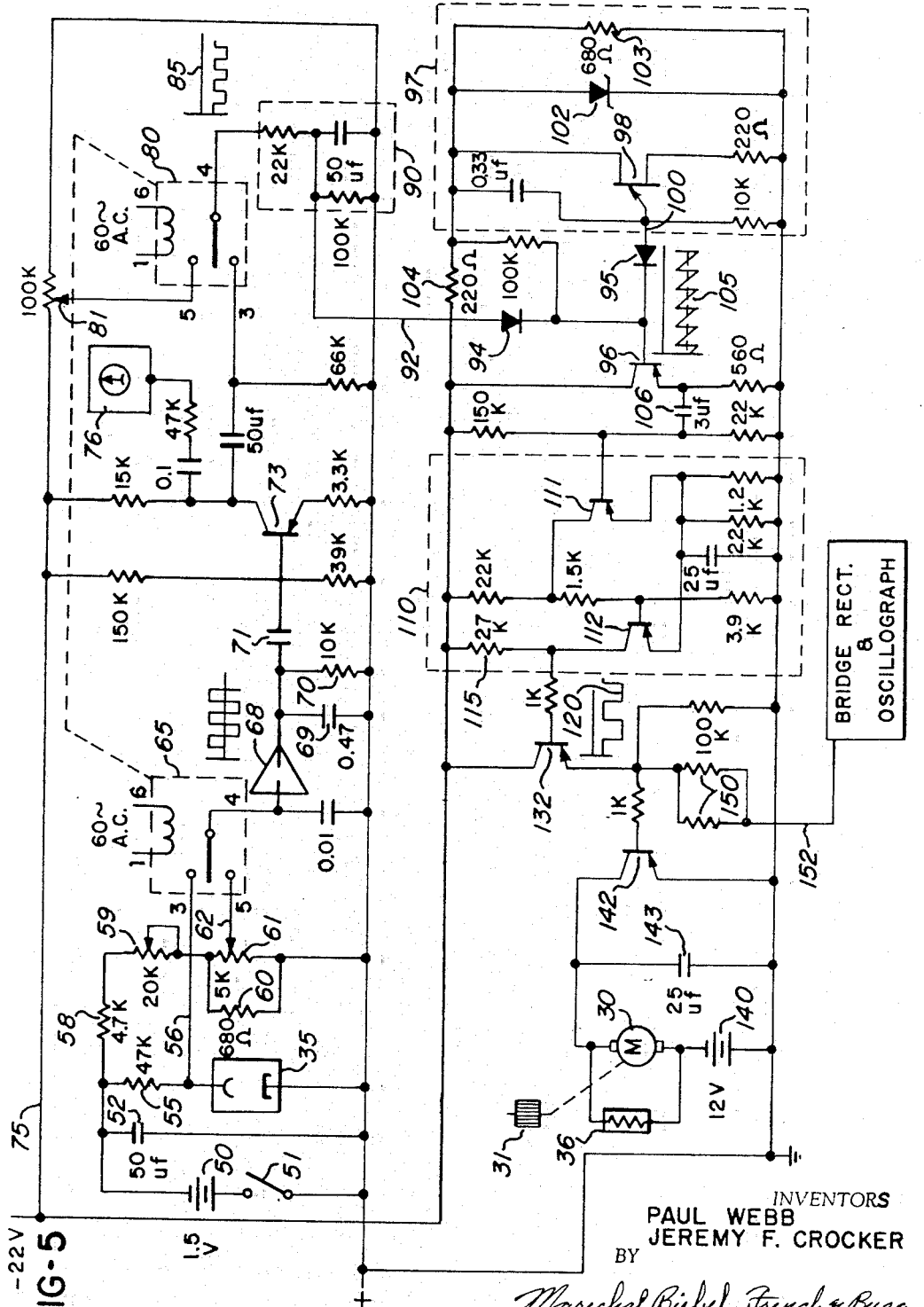

3,401,683
APPARATUS AND METHOD FOR METABOLISM MEASUREMENT
Paul Webb and Jeremy F. Crocker, Yellow Springs, Ohio, assignors to Webb Associates, Inc., Yellow Springs, Ohio, a corporation of Ohio
Filed June 3, 1965, Ser. No. 460,934
13 Claims. (Cl. 128—2.07)

ABSTRACT OF THE DISCLOSURE

An open-ended metabolic rate monitor including a headpiece received over a subject's head incorporating a controllable electric blower for moving air through the headpiece for breathing by the subject. A polarographic cell is positioned downstream from the subject and is responsive to oxygen partial pressure. A control system operates the blower to maintain a given oxygen partial pressure at the cell downstream from the subject, and the blower excitation voltage is measured as an indication of oxygen consumption rate of the subject.

---

This invention relates to metabolism, and more particularly to apparatus and method for making continuous measurements of the metabolic rate of a subject.

The measurement of the oxygen consumption, such as that of a person performing work or doing assigned tasks, has previously required the measurement of several variables and the correlation of these variables to arrive at a measure of metabolism. In a typical installation, the air going through an enclosure was quantitatively measured and the change in air content was sampled and measured to determine the quantity of oxygen used. Such measurements required a considerable amount of time in which to complete, and involved apparatus which was both cumbersome and bulky.

A principal object of this invention is the provision of apparatus and a method for making direct measurements of oxygen consumption. In the preferred embodiment, the subject is placed in an air conduit or duct system and air is moved past the subject. Preferably, the rate of air movement is some multiple of or is in excess of, the respiratory rate of the subject. An oxygen sensing device is placed in the airstream at a location downstream of the man, and senses the free oxygen content of the mixed expired air and the excess air moving past the subject.

The rate at which the air is moved past the subject is controllable and variable. A control loop is provided by which the amount of air moved through the open system is increased with increasing consumption of oxygen tending to maintain a constant condition at the downstream sensor. Accordingly, the rate of air movement may then be directly measured as a function of the oxygen consumption of the subject.

The advantages of the above-described method and system include the provision of a single signal or parameter which is, in itself, a function of oxygen consumption, with no further computation required.

A further object and advantage of the present invention resides in the provision of a simple signal which may be easily telemetered and which is rapidly available for yielding a continuous record of oxygen consumption, thereby eliminating the need for periodic sampling.

A further advantage of the present system resides in the fact that the total ventilation is varied and is increased with increasing oxygen consumption. Thus the respiratory needs of the subject are supplied by the increased volume of air movement.

A further advantage of the invention resides in the fact that it is adaptable to be incorporated into a small, light-weight and readily portable package which can be worn by the subject.

It is accordingly another important object of this invention to provide a metabolic rate monitoring device which is adapted to be worn by a person without interference with the activity of the wearer. Since changes in activity are assessed physiologically by charges in oxygen consumption (metabolic rate), the invention being small enough not to modify normal activity allows a true measurement to be made without the process of measuring itself altering the measurement.

The preferred embodiment includes a hard hat or a helmet which is placed over the head of the subject and which includes provision for air entry for respiration. The helmet includes a small instrument package which incorporates an electric blower and an oxygen sensor. Preferably, the oxygen sensor is a polarographic cell which directly measures the oxygen content of the air flowing through the system downstream from the subject.

The closed-loop control method and system of this invention has the further advantage of operating the oxygen sensing device, such as a polarographic cell, at or near one point in its response curve rather than requiring the device to follow accurately the changing partial pressure of oxygen over a wide range of oxygen content in the air being measured. The system and the method of this invention is applicable not only for the measurement of the activity rate or metabolic rate of a person, but may also be applied to the measurement of such rates for any other subject or object which is capable of consuming or assimilating free oxygen from air. For example, measurements are often made of the metabolic rate of animals, both caged and free, and this invention may be used in these studies.

A further object of this invention is the provision of a system and method for the continuous measurement of oxygen consumption of a subject in which air is moved in a controlled path past the subject by a blower or air moving device capable of speed or capacity regulation and in which an oxygen responsive detector is positioned in the system effectively downstream from the subject to produce an electric signal which is a function of changes in the oxygen content of the air passing thereby, a blower or air moving control which is connected to receive this signal and is effective to increase the ventilation, such as by increasing the power input to the blower, with decreasing oxygen in the system thereby tending to stabilize the oxygen content in the air downstream from the subject at a constant level, and measuring the power input or drive of the blower as an indication of the rate of oxygen consumption.

These and other objects and advantages of the invention will be apparent from the following description, the accompanying drawing and the appended claims.

In the drawings:

FIG. 1 shows a typical metabolic rate monitor constructed according to my invention being worn by a man;

FIG. 2 is a somewhat diagrammatic illustration showing a typical manner of using this invention;

FIG. 3 is a diagrammatic illustration of the invention showing the air flow arrangement;

FIG. 4 is a characteristic oscillograph tracing showing the output of the invention as related to different activities of a subject being tested;

FIG. 5 is a schematic diagram of a circuit suitable for use with the present invention; and FIG. 6 is a slightly modified form of the invention.

The preferred embodiment of this invention is shown as being applied to a metabolic rate measuring device and system for man, but it is obvious that the teachings may be applied to the measurement of the oxygen consumption of other forms of life, including animals or, in fact, anything capable of taking free oxygen from the atmosphere. Referring to the figures of the drawing which illustrate the preferred embodiment of this invention, a subject, in this case a man, is shown at 10 in FIG. 1 as wearing a helmet 11 which is formed with a depending and generally cylindrical clear plastic enclosure 12. An open mesh or cloth neck ring 13 is situated circumferentially around the bottom of the enclosure 12 and provides an air inlet 14 for the system. The plastic enclosure 12 and the hard helmet 11 are part of a duct or conduit means which is open at its opposite ends and which is adapted to receive the inhalations and the exhalations of a subject.

The duct or conduit system of the preferred embodiment further includes a flexible tube 15 which leads to a control unit 16 and which discharges at 17 out the bottom thereof. The control unit 16 includes the electrical circuits of the invention as well as the oxygen detecting means, and air moving means for causing air to move through the conduit from the inlet 14 to the outlet 17. Also, the unit 16 may presumably contain the batteries or power source and the electrical circuits, to the end that the metabolic rate measuring device may be wholly self-contained and carried on a subject while permitting a high degree of free movement of the subject.

A typical metabolic rate testing program may include a treadmill 20 such as shown in FIG. 2 in which the inclination of a moving tread 21 may be adjusted, such as by a lead screw 22 or other means. A motor 23 drives the belt 21 at a predetermined rate in order to cause the subject to do a controlled amount of work. Typical examples of such a program are shown in FIG. 4 and include resting, marching at 2.5 m.p.h. at a 4% grade and marching at 4.0 m.p.h. on a 5% grade. Obviously, other programs may be employed according to the results desired to be obtained.

The metabolic rate measuring method of this invention includes moving or blowing air containing free oxygen in controlled relation to a subject so that the subject receives essentially all of its oxygen requirements from the air flow; sensing a decrease in oxygen content in the air flow downstream from the subject; and increasing the total air flow to the subject by an amount sufficient substantially to make up the oxygen decrease as measured downstream from the subject. The rate of air flow is then measured by direct measurement, or by observing the operation of the blower, as an indication of the metabolic rate. This arrangement has the advantage of increasing the overall ventilation to the subject during the times at which the subject is in most need of it, that is, during the times of greatest oxygen consumption and greatest work. This system also has the advantage of using an oxygen detecting cell at or near one point in its response curve.

FIG. 3 shows a somewhat diagrammatic view of the air duct system, comprising the helmet 11, the flexible tube 15 and the control unit 16. Controllable air moving means, such as a blower motor 30 and blower wheel or fan blades 31 are mounted in the duct system to cause air to pass from the inlet 14 to the outlet 17. The capacity of the blower 30 substantially exceeds the air requirements of the subject and accordingly moves an excess supply of air from the inlet to the outlet from and into which the subject can freely breathe. Oxygen detecting means is located within the duct system at a point in the airstream which is downstream from the subject so that the air which is passing the oxygen detector is a mixture of the free air moving through the duct and the oxygen-depleted air which is expired by the subject. Preferably, the oxygen detector is positioned at a point at which there has been reasonably thorough mixing of the air to provide continuity of results.

The oxygen detector may preferably comprise a polarographic cell of the type described and claimed in the U.S. patent of Clark 2,913,386, issued Nov. 17, 1959. The polarographic cell provides a substantially instantaneous response to changes in the partial pressure of the oxygen in the air passing thereover, and provides an electrical signal which varies with changes in oxygen partial pressure. Reference may be had to the Clark patent for a complete description of the operation of a suitable polarographic cell for this purpose.

Such a polarographic cell is shown at 35 in FIG. 3 as being received within the duct and preferably within the unit 16 to respond to changes in the oxygen partial pressure of the air passing therethrough. In the event that the output of the cell 35 is affected by temperature changes, a suitable heater 36 may be employed in connection therewith to stabilize the temperature of the cell.

The unit 16 preferably contains a control or servo loop circuit for the motor 30 which is connected to receive the signal from the cell 35. A suitable such control circuit is shown in FIG. 5 and is effective to increase the power input into the blower motor 30 with decreasing oxygen measured at the cell 35, tending to stabilize the oxygen partial pressure in the air downstream of the subject at a constant and preselected level. Accordingly, the amount of air being drawn through the system may be taken as a direct and instantaneous measurement of the oxygen consumption of the subject at any given time. This air flow may be measured directly to give an indication of the rate of oxygen consumption, such as by measuring blower speed.

While such direct air flow measurements may be satisfactory, it is preferred to measure the power input of the blower motor 30 as a direct indication of air flow and, accordingly, of oxygen consumption. Therefore, the control system indicates means responsive to the power input of the blower for providing the direct indication of oxygen consumption rate. In FIG. 4, the blower input voltage is plotted against time as a measurement of such oxygen consumption, and the oscillograph tracing 38 represents the variations in metabolic rate with time as the various exercises and functions are performed by the subject.

FIG. 5 is a wiring diagram of a control or feed-back circuit which may be included entirely within the unit 16 and which takes a signal from the cell 35 to control the operation of the blower motor 30 in the manner outlined above. For this purpose, a power supply 50 for the cell 35 is provided, which may be a 1½ volt battery, and which is connected across the cell by a suitable on-off switch 51. A capacitor 52 is placed across the power supply to filter out transients. The cell 35 is diagrammatically illustrated in FIG. 5 as being applied to the power source 50 through a load resistor 55 with the result that changes in the resistance of the cell result in changes in voltage across the load resistor 55. The polarographic cell acts as a constant current device at any given oxygen level, and exhibits an increased resistance with decreasing oxygen. This results in a more negative signal appearing on lead 56.

The circuit further includes a reference voltage which is also taken from the source 50 through a voltage divider network consisting of a fixed resistor 58, a variable resistor 59 and a parallel circuit consisting of a resistor 60 and a potentiometer 61.

Means for alternately selecting between the cell output on lead 56 and the reference voltage on lead 62 of the potentiometer 61 includes a single pole, double throw switch or chopper 65 which, driven by a vibrator synchronously with a similar chopper 80, serves to chop the input voltages on leads 56 and 62 into a square wave. The vibrator may conveniently be driven at 120 cycles per second from a source of 60 cycle AC power. The amplitude and phase of the square wave at the output of the chopper 65 on terminal 4 are determined by the magnitudes of the cell and reference voltages.

The reference voltage on lead 62 is preferably set slightly higher than the cell voltage on lead 56 with the subject in a resting metabolic state. A reduced concentration of oxygen at the cell produced by an increase in oxygen uptake of the subject will result in a decrease in cell voltage. The amplitude of the square wave at terminal 4 will increase, forming an error signal which will, after amplification, be applied to the blower 30 to drive the concentration of oxygen at the cell 35 toward normal.

The output of the chopper 65 is applied to a linear amplifier 68 which may provide approximately 40 db of gain. A small filter capacitor 69 and resistor 70 limit the high frequency output response, and a relatively large coupling capacitor 71 couples the 120 cycle wave form to the base of a current amplifying transistor 73. The transistor 73 as well as the major portion of the remainder of the circuit receives its power from a —22 volt supply line 75.

Means for balancing the polarographic cell 35 to any given oxygen content includes a meter 76 which incorporates a bridge rectifier and which is connected to the collector circuit of the transistor 73. Since the meter 76 measures the AC component from the chopper 65, the reference voltage adjustments at 59 and 61 may be made so as to give a zero or no-voltage indication on the meter 76. As mentioned above, this is preferably the point at which a man is resting in the system. It has been found that approximately one part of breath for four parts of air provides an optimum starting point and represents an oxygen content of approximately 20 percentage at the detector or cell 35.

The circuit further includes a second synchronous chopper 80 for decommutating the signal from the first chopper 65, as amplified. The action of the capacitor 71 causes the signal at the base of the transistor 73 to have an average value of zero. The output signal of transistor 73 is capacitor coupled to post 3 of chopper. Because of these capacitors, the signal at post 3 has an average value of zero.

A further reference voltage includes a potentiometer 81, the wiper of which is connected to the post number 5 of the chopper 80. Accordingly, the chopper alternately samples the reference voltage on post number 5 and an error voltage on post number 3. The sign of this error voltage depends upon the relative magnitudes of cell voltage on lead 56 and reference voltage on lead 62. The output of the chopper 80 is a square wave with a non-zero average value which is a function both of oxygen content and the setting of the potentiometer 81, which provides a means by which initial speed of the blower motor 30 may be set. This signal is shown in the diagram 85 and is applied to an integrator circuit 90 in which it is smoothed to a DC level at the lead 92.

The voltage output of the integrator 90 is applied to a negative "AND" circuit or an "OR" circuit comprising the diodes 94 and 95 which have a common junction at the base of an emitter-follower 96. A saw-tooth sweep generator circuit 97 includes a unijunction transistor 98 and operates as a relaxation oscillator to put out a negative-going saw-tooth wave form on the lead 100 to the diode 95. The operation of such a saw-tooth generator is known in the art, and reference may be had to pp. 194 and 195 of the Transistor Manual (6th ed.) by General Electric Company, Syracuse, N.Y., for a technical description. A Zener diode 102 and resistor 103 provides voltage regulation across a dropping resistor 104 for the sweep generator.

As has been described above, the decrease in the oxygen level measured at the cell 35 results in a more negative signal at the diode 94. The OR circuit follows the more positive of the inputs, and therefore will result in a portion of the saw-tooth wave form being clipped off, as shown in the diagram at 105. The circuit parameters are chosen such that preferably some portion of the saw-tooth wave form will be clipped, with less clipping occurring with decreasing oxygen partial pressure at the cell 35 and maximum clipping occuring when no oxygen is being consumed from the duct.

The clipped saw-tooth wave form is applied by the emitter-follower 96 through a coupling capacitor 106 which removes the DC component and applies the wave form to a squaring amplifier 110. Preferably, the amplifier 110 is a Schmitt trigger comprising transistors 111 and 112. The squaring amplifier triggers at a given point in the wave form, and will stay on as the input voltage exceeds this point but will turn off just as soon as the wave form drops below the preset level. Accordingly, the output of the Schmitt trigger or squaring amplifier 110 taken across the load resistor 115 is a square wave pulse which has a width which is proportional to the clipped-off portion of the saw-tooth wave form. The transistor 112 will be cut off during the times corresponding to the remainder of the wave form 105. Therefore, the Schmitt trigger 110 provides a motor driving signal which is pulse-modulated and which has a negative pulse or wave form which corresponds to the non-clipped portion of the saw-tooth wave form, the duration of which corresponds to the oxygen measured by the cell 35. A typical wave form is shown at 120 as being applied to a further emitter-follower 132.

The blower motor 30 may preferably consist of a permanent magnet type of direct current motor which operates from a source 140 of direct current power. In this embodiment, the source 140 is shown as being separate from the —22 volt source 75, but it is within the scope of the invention to use only a single direct current source for both the motor drive and the servo-feed-back loop.

The drive of the motor 30 is controlled by a power transistor 142 which has its emitter-collector circuit connected in a series with the motor 30 and which, in effect, provides a pulse-modulation drive to the motor 30. The capacitor 143 and the motor effectively integrate the pulse drive to form a sufficiently smooth driving torque to the blower wheel.

As the oxygen partial pressure in the air as measured at the cell 35 decreases, for instance, the circuit shown in FIG. 5 operates to increase the driving pulse width correspondingly to the motor 30 resulting in an increase of blower speed and a corresponding increase in the quantity of air flowing through the system. The increase in air quantity reduces the error signal at the cell 35 to the point where the system again reaches a stable condition, and the drive power to the motor 30 may be measured as a direct indication of oxygen consumption.

Means for measuring or indicating motor drive may consist of a further bridge rectifier meter, similar to the meter 76 coupled to the base of the drive transistor 142 by resistors 150. The resistors 150 are preferably chosen to provide the desired scale calibration. The output taken on line 152, when rectified, is therefore a direct measurement of motor drive. This output may also be applied to an oscillograph input. This will result in a record similar to that illustrated at 38 in FIG. 4 as a continuous and substantially instantaneous record of the metabolic rate of the subject.

The operation of the invention is largely self evident from the above detailed description of the construction and operation of the servo loop which connects the oxygen detecting cell 35 to the blower motor 30. A subject who is to be observed or tested puts on the apparatus by placing his head within the helmet 11 and the Plexiglas enclosure 12. The unit 16 may be suitably attached as by a strap to his back, and the blower motor started by applying the voltage sources 75 and 140. Also, the switch 51 is closed to apply the reference voltage 50 to the cell 35. The voltage reference controls 59 and 61 are adjusted while observing the meter 76 to give zero meter indication while the subject is at rest. Accordingly, the circuit parameters are adjusted so that either a decrease or an increase in normal oxygen consumption can be detected.

The subject receives all of his respiratory air from the portion of the duct defined by the hat, and will exhale into this same portion of the duct. Preferably the blower motor 30 is adjusted by the control 81 so that there are approximately four parts of fresh air supplied to one part of expired air. The expired air mixes within the enclosure defined by the helmet 11 and the shield 12 and enters through the flexible tube 15 into the unit 16, where it comes into contact with the cell 35.

Once the system has been adjusted as outlined above and as long as the subject remains at rest, the output will remain substantially constant at a given level, as shown at 160 in FIG. 4. Assume for the purpose of illustration, that the subject 10 begins performing work, such as shown in the marching portion of the graph of FIG. 4. Very soon after beginning this work, his oxygen consumption will rise resulting in a momentary depletion of the oxygen content within the system. This depletion will be sensed as an increase in resistance at the cell 35 which will increase the negative input to the chopper 65, and, as amplified, to the chopper 80. This will, in turn, result in an increasingly negative integrated voltage at the lead 92 and will result in less clipping of the saw-tooth wave form by the OR circuit. When this modified wave form is applied to the Schmitt trigger 110, the width of the positive-going pulses are correspondingly decreased, resulting in a corresponding increase of the negative pulses.

This altered signal causes the blower motor 30 to speed up to the point where the circuit is again placed in a stable condition by increasing the air flow through the system, and the increased operation of the blower is detected at the lead 152 and applied to the oscillograph, representing the increased oxygen consumption rate as shown in FIG. 4.

The invention is not limited to the precise form of the circuit shown and any suitable circuit may be used which utilizes the signal from the cell 35 and modifies the drive to the blower motor 30 in such a manner as to maintain a substantially constant free oxygen content at the cell 35 during variations in the oxygen consumption within the duct system in which the subject is placed, and which will provide means for measuring the variations in air flow through the system or the input to the air moving means as a direct indication of air consumption. The particular circuit shown has the advantage of employing pulse-width modulation in a control circuit characterized by stability and freedom from drift.

It has been found that the tendency of a polarographic cell to be sensitive to temperature variations due to the changes in air flow may be compensated for by suitably heating the cell and by varying the amount of heating in accordance with the quantity of air flow therepast. The convenient arrangement for this purpose consists of the heater 36 which is connected effectively in parallel to the motor 30 so that the current input to the heater corresponds to the power input to the motor. The heater drain preferably is sufficiently small so that the loading on the motor circuit is negligible.

The invention is not limited to men or animals in a normal atmosphere. In certain industrial environments, the air may have less than the normal content of oxygen owing to the presence of impurities, or to a depletion of oxygen in a confined space. In other instances, the atmosphere make up may be unknown. In such cases, the invention may preferably make use of two oxygen sensors, one upstream and one downstream from the wearer, such as shown diagrammatically in FIG. 6. The upstream detector 165 may be considered as a first sensing means responsive to oxygen content of the air entering the passageway leading to the subject for providing a signal proportional to such content. It is employed in addition to the detector 35. The difference therebetween detected and measured in a differential detector and amplifying circuit 170.

In practice, the output of the upstream detector 165 may be advantageously employed as an input to pin 5 of the chopper 65 in FIG. 5 in lieu of the reference voltage on line 62. This difference signal may then be detected in the manner described above and applied through a suitable motor drive 170 in the manner described above to drive the blower. The remainder of the circuit which has been described in connection with FIG. 5 may advantageously be used for this purpose.

Another use for the present invention is that of measuring the metabolic rate of a man or animal in a space cabin or space suit, where the atmosphere breathed is an artificial one containing pure oxygen or a mixture of oxygen and other gas or gases. Again the embodiment shown in FIG. 6 utilizing two sensors may be used as described above to detect a change in oxygen partial pressure across the wearer, and this will be used to increase the quantity of air movement by increasing the drive to the motor 30, and measured as an indication of the metabolic rate.

It is therefore seen that this invention provides a system and a method for the continuous measurement of the metabolic rate of a subject which is lightweight and adapted to be self-contained. When worn by the subject, the device permits a maximum freedom of activity and movement while providing positive ventilation to the subject, which ventilation advantageously increases with increasing oxygen demands. The system is particularly adapted to be incorporated into a space suit, and the signal on the line 152 may be telemetered to a remote station for recording of continuous observation.

Whenever the term "air" is used herein and in the appended claims, it is intended that this term be considered generally to include any gas, gaseous mixture, or atmosphere made up of or containing oxygen and capable of use by by a subject.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. A device for measuring metabolic rate of a subject comprising means defining an air passageway, means in said passageway adapted to receive the respirations of said subject, blower means positioned to move air through said passageway, sensing means responsive to oxygen content in said passageway downstream of said respiration receiving means operable to provide a signal which varies with oxygen content, blower motor control means responsive to said signal and effective to increase blower speed with decreasing oxygen measurements by said sensing means tending to maintain the oxygen content constant at said sensing means, and means providing a signal proportional to the rate of air movement through said passageway as an indication of metabolic rate of said subject.

2. A device for the continuous measurement of metabolic rate comprising means defining an air duct open at each end, air moving means for causing air to move generally in one direction through said duct, controllable motor means connected in driving relation to said air moving means, means in said duct adapted to receive the inhalations and exhalations of a subject the metabolism of which is to be measured, an oxygen responsive detector in said duct positioned effectively downstream from the region in said duct to which the said subject exhalations are received thereinto and effective to produce an electric signal in response to changes in the oxygen content of the air passing thereby in said duct, a motor control circuit connected to receive said signal and effective to increase the power input to said drive motor means with decreasing oxygen in said duct at said detector tending to stabilize oxygen content in the air downstream of the subject at a constant level, and means responsive to the power input to said motor means providing an indication of rate of oxygen consumption.

3. A device for the continuous measurement of metabolic rate comprising means defining an air duct open at each end, air moving means for causing air to move generally in one direction through said duct, controllable motor means connected in driving relation to said air moving means, means in said duct adapted to supply air for the inhalations of and receive the exhalations of a subject the metabolism of which is to be measured, a polarographic oxygen responsive cell in said duct positioned effectively downstream from the region in said duct to which the said subject exhalations are received thereinto and effective to produce an electric signal in response to changes in the oxygen content of the air passing thereby in said duct, a motor control circuit connected to receive said signal and effective to increase the power input to said drive motor means with decreasing oxygen in said duct at said detector tending to stabilize oxygen content in the air downstream of the subject at a constant level, and a recorder responsive to the voltage input to said motor means providing an indication of rate of oxygen consumption of said subject.

4. A device for making substantially instantaneous and continuous measurements of the metabolic rate of a subject comprising means defining an air conduit, means in said conduit for supplying all of the air for respiration of a subject and for receiving the exhaled air from said subject, blower means positioned to move air through said conduit and adapted to supply an amount of air which is excessive to the needs of said subject, an electric drive motor for said blower means, oxygen sensing means responsive to the oxygen content in said conduit downstream of the point at which said exhalations are received therein and effective to provide an electrical signal which varies with said oxygen content, blower motor control means including a circuit which is responsive to said signal and which is effective to apply a varying drive to said motor which increases with decreasing oxygen content at said sensing means tending to maintain a substantially constant oxygen content at said sensing means by varying the total amount of air moving through said conduit, and indicator means responsive to the input to said motor for providing a signal which is correlated with the metabolic rate of said subject.

5. A device for making substantially instantaneous and continuous measurements of the metabolic rate of a person comprising means defining an air conduit including an enclosure adapted to be worn by said person and defining a space from which all of the air for respiration of a subject is supplied for and for receiving all of the exhaled air from said subject, a blower positioned to move air through said conduit and adapted to supply an amount of air which is excess to the needs of said person, an electric drive motor for said blower, an oxygen sensing polarographic cell responsive to the oxygen content in said conduit downstream of the point at which said exhalations are received therein and effective to provide an electrical signal which varies with said oxygen content, blower motor control means including a circuit which is responsive to said signal and which is effective to apply a varying drive to said motor which increases with decreasing oxygen content at said cell tending to maintain a substantially constant oxygen content at said cell by varying the amount of total air moving through said conduit, and means responsive to the rate of air flow through said conduit providing a signal which is correlated with the metabolic rate of said subject.

6. Apparatus for measuring the metabolic rate of a subject comprising means defining an enclosure which is adapted to be received over the head of a subject and provide ventilation for respiration including an air inlet and an air outlet, a controllable electric blower for moving an excess supply of air from said inlet to said outlet from and into which said subject may freely breathe, a polarographic oxygen sensing cell positioned to respond to the oxygen content between said subject and said outlet and to provide an electric signal proportional to said content, a control circuit connected to receive said cell signal and providing a motor drive signal which increases with decreasing oxygen level at said cell tending to maintain said oxygen level at said outlet constant by varying the quantity of total air flow through said enclosure by said blower, and means responsive to said motor drive signal providing an indication of the metabolic rate of said subject.

7. Apparatus for measuring the metabolic rate of a subject comprising means defining an enclosure which is adapted to surround the head of a subject and provide ventilation for respiration including an air inlet and an air outlet, a controllable electric blower for moving an excess supply of air from said inlet to said outlet from and into which said subject may freely breathe, an oxygen sensing cell positioned to respond to the oxygen level between said subject and said outlet and to provide an electric signal proportional to said level, a control circuit including means forming a reference signal, means comparing said reference signal with said cell signal and providing a control signal proportional to the difference therebetween, a blower control responsive to said control signal for establishing a blower drive signal which increases with decreasing oxygen level at said cell tending to maintain said oxygen level at said outlet constant by varying the quantity of total air flow through said enclosure by said blower, and means responsive to said blower drive signal providing an indication of the metabolic rate of said subject.

8. Apparatus for measuring the metabolic rate of a person comprising means defining an enclosure which is adapted to surround the head of said person and provide ventilation for respiration including an air inlet and an air outlet, a controllable electric blower for moving a supply of air from said inlet to said outlet from and into which said person may freely breathe, an oxygen sensing cell positioned to respond to the oxygen level between said subject and said outlet and to provide an electric signal proportional to said level, a control circuit including means forming a reference signal, means comparing said reference signal with said cell signal and providing a control signal proportional to the difference therebetween, a blower control including a further reference adjustable to establish an initial blower drive for moving air past said person at a rate which is multiple of said person's respiratory requirements, means responsive to said control signal for modifying said blower drive to increase said drive with decreasing oxygen level at said cell tending to maintain said oxygen level at said outlet constant by varying the quantity of total air flow through said enclosure, and means responsive to said blower drive providing an indication of the metabolic rate of said person.

9. The method of measuring the continuous metabolic rate of a person comprising the steps of, blowing air containing free oxygen capable of use by said person through a passageway for exclusive use by the person so that the person receives essentially all of his oxygen requirements from the air flow, receiving the exhalations of said person in said passageway for mixture within the air passing through said passageway, discarding the mixture so that it is not rebreathed, sensing the decrease in oxygen partial pressure of the mixed air flow downstream from the person varying the incoming air flow through said passageway by an amount sufficient substantially to make up the decrease in oxygen partial pressure as measured downstream from said person, and measuring the flow rate of air in said passageway as an indication of the oxygen consumption rate of said person.

10. The method of continuously measuring the metabolic rate of a person, comprising the steps of moving air containing free oxygen capable of use by said person in a controlled relation thereto so that the person receives essentially all of his oxygen requirements from said air flow with the volume of said air flow being approximately four times greater than the normal respiration rate at rest of said person providing an atmosphere of approximately 20% oxygen for breathing, sensing a decrease in the oxygen content in the air flow downstream from the person occurring with increased oxygen consumption thereof, increasing the total air flow to said person by an amount sufficient to make up the oxygen depletion as measured downstream therefrom maintaining said downstream oxygen content substantially constant, and using the air flow rate as an indication of the oxygen consumption rate of said person.

11. The method of continuously measuring the metabolic rate of a subject capable of consuming oxygen comprising the steps of moving air containing free oxygen capable of use by said subject in a controlled relation past the subject so that the subject receives essentially all of its oxygen requirements from said air flow with the amount of said air flow being in excess of the oxygen requirements of said subject, measuring the oxygen partial pressure of the air upstream of the subject, sensing the decrease in oxygen partial pressure in the air flow downstream from the subject as compared to the oxygen partial pressure measured upstream of the subject, discarding the air from which the subject has breathed so that it is not rebreathed, varying the incoming air flow to said subject by an amount proportional to the difference in oxygen partial pressure between the upstream and downstream measurements, and measuring the flow rate of air as an indication of the oxygen consumption rate of said subject.

12. A device for measuring metabolic rate of a subject comprising means defining an air pasasgeway, means in said passageway adapted to receive the respirations of said subject, a controllable blower positioned to move air through said passageway, first sensing means responsive to the oxygen content of air entering said passageway positioned generally upstream of said respiration receiving means and providing a first signal which represents the oxygen content of air entering said passageway, second sensing means responsive to oxygen content in said passageway downstream of said respiration receiving means and operable to provide a further signal which varies with oxygen content downstream of said subject, blower motor control means responsive to the difference between said signals and effective to increase blower speed with an increase in said signal difference by increasing the power input to said blower and means responsive to the power input to said blower providing an indication of metabolic rate of said subject.

13. The method of continuously measuring the metabolic rate of a subject capable of consuming oxygen comprising the steps of moving air containing free oxygen capable of use by said subject in a controlled relation past the subject so that the subject receives essentially all of its oxygen requirements from said air flow with the amount of said air flow being in excess of the oxygen requirements of said subject, discarding the air from which the subject has breathed so it is not rebreathed, sensing the decrease in oxygen partial pressure in the air flow downstream from the subject, varying the incoming air flow to said subject by an amount sufficient substantially to make up the decrease in oxygen partial pressure as measured downstream therefrom, and measuring the flow rate of air as an indication of the oxygen consumption rate of said subject.

References Cited

W. James Leach, "Modification of Metabolism Apparatus," pp. 341–342 of Science for Mar. 15, 1946.

RICHARD A. GAUDET, *Primary Examiner.*

S. BRODER, *Assistant Examiner.*